United States Patent
Bloom et al.

(10) Patent No.: US 8,215,212 B2
(45) Date of Patent: Jul. 10, 2012

(54) ON-VEHICLE BRAKE LATHE WITH INDIRECT DRIVE

(75) Inventors: Daniel A. Bloom, Hartford, VT (US); Christopher L. Greenwald, Waban, MA (US)

(73) Assignee: Pro-Cut Licensing Company, LLC, West Lebanon, NH (US)

( * ) Notice: Subject to any disclaimer, the term of this patent is extended or adjusted under 35 U.S.C. 154(b) by 434 days.

(21) Appl. No.: 12/414,701

(22) Filed: Mar. 31, 2009

(65) Prior Publication Data

US 2009/0301273 A1 Dec. 10, 2009

Related U.S. Application Data

(60) Provisional application No. 61/058,982, filed on Jun. 5, 2008.

(51) Int. Cl.
*B23B 5/32* (2006.01)

(52) U.S. Cl. ......................................................... 82/112

(58) Field of Classification Search .................... 82/112, 82/105
See application file for complete search history.

(56) References Cited

U.S. PATENT DOCUMENTS

| | | | | |
|---|---|---|---|---|
| 1,554,302 A * | 9/1925 | Slyder et al. | ................... | 82/173 |
| 3,939,720 A | 2/1976 | Aaen et al. | | |
| 4,215,603 A * | 8/1980 | Jones | .............................. | 82/1.3 |
| 4,455,900 A | 6/1984 | Callanan et al. | | |
| 4,478,116 A * | 10/1984 | Fuller | ............................. | 82/112 |
| 4,506,570 A | 3/1985 | Wood et al. | | |
| 4,523,499 A * | 6/1985 | Aldridge, Jr. | ................... | 82/112 |
| 5,099,728 A | 3/1992 | Thiem | | |
| 5,119,702 A | 6/1992 | Bogaerts et al. | | |
| 5,127,279 A * | 7/1992 | Barthruff | ........................... | 74/6 |
| 5,265,486 A * | 11/1993 | Hartman et al. | ............... | 74/416 |
| 5,500,989 A | 3/1996 | Ford et al. | | |
| 5,560,271 A | 10/1996 | Duty | | |
| 5,623,859 A * | 4/1997 | Benton | ........................... | 82/136 |
| 5,868,052 A | 2/1999 | Benton | | |
| 6,101,911 A | 8/2000 | Newell et al. | | |
| 7,793,420 B2 * | 9/2010 | Griep et al. | ..................... | 30/394 |
| 2005/0016338 A1 * | 1/2005 | Gerdes et al. | ................... | 82/112 |

FOREIGN PATENT DOCUMENTS

JP    61117001 A  *  6/1986

OTHER PUBLICATIONS

TD 502, COMEC srl, Corso Italia, 55/A, 33080 Porcia (Pn)—Italy, downloaded from URL: http://www.comecpn.com/schede/Dep_TD502.pdf.

* cited by examiner

*Primary Examiner* — Kenneth E. Peterson
*Assistant Examiner* — Jennifer Swinney
(74) *Attorney, Agent, or Firm* — Michael J. Weins; Jeffrey E. Semprebon (57) ABSTRACT

An on-vehicle disk brake lathe has a motor connected to a right-angle gearbox mounted to a body of the lathe, the gearbox in turn driving a spindle shaft through a flexible drive linkage such as a belt or chain. The spindle shaft extends parallel to a gearbox output shaft, and both are normal to an axis of rotation of the motor. The flexible drive linkage can be tensioned by adjustably mounting the gearbox to the lathe body or by use of an adjustably positioned tensioning element. A cover can enclose the flexible drive linkage. The separate gearbox allows the use of durable bearings for the spindle shaft, and allows these bearings to be spaced apart to provide a high degree of stability. The modular structure of the resulting lathe simplifies fabrication and repair, and allows use of a modular body for the lathe.

22 Claims, 5 Drawing Sheets

ON-VEHICLE BRAKE LATHE WITH INDIRECT DRIVE

FIELD OF THE INVENTION

The present invention relates to on-vehicle disk brake lathes that are employed to machine a brake disk while the brake disk remains mounted to a wheel hub of a vehicle.

BACKGROUND OF THE INVENTION

On-vehicle disk brake lathes classically employ a worm drive to provide power from a motor to a lathe spindle. The motor is aligned with and coupled to a worm shaft on which a worm is mounted, the worm rotating about a worm shaft axis. The worm in turn engages a worm gear on a spindle shaft of the lathe spindle, providing the worm drive. The spindle shaft rotates about a spindle axis that is perpendicular to the worm shaft axis, and thus is also perpendicular to a motor axis of rotation when the motor is coupled to the worm shaft.

The lathe has a cast housing, which is assembled around the worm and the worm gear, as well as around a portion of the worm shaft and a portion of the spindle shaft, forming a lathe housing. Seals and bearings are provided for the worm shaft and the spindle shaft to form a sealed unit to house the worm drive.

SUMMARY

The present invention provides an on-vehicle disk brake lathe for machining the surfaces of a brake disk of a vehicle while the brake disk remains in place on a wheel hub and rotates about a wheel hub axis. The lathe has a spindle shaft that rotates about a spindle axis, and a hub mount which attaches to the wheel hub of the vehicle. An alignment mechanism is operably connected between the spindle shaft and the hub mount for aligning the spindle axis with respect the wheel hub axis to reduce misalignment of the spindle axis relative to the wheel hub axis. Such alignment mechanisms are taught in U.S. Pat. No. 6,101,911. The lathe has a lathe body with a pair of spindle bearings that rotatably mount the spindle shaft to the lathe body.

A motor is provided for driving the spindle shaft. The motor has an output shaft that rotates about a motor axis. The motor is connected to a right-angle gearbox so as to operably connect the motor shaft to a gearbox input shaft of the right-angle gearbox, thus allowing the motor to drive the gearbox input shaft. The motor can be attached directly to the gearbox or can be attached to the lathe body, to which the gearbox is also attached. The motor shaft and the gearbox input shaft can be connected by a resilient coupling structure that provides a limited degree of resilient motion to damp vibrations.

The right-angle gearbox also has a gearbox output shaft. The gearbox input shaft rotates about an input shaft axis, while the gearbox output shaft rotates about an output shaft axis which is normal to the input shaft axis. The gearbox contains gears that operably connect the gearbox input shaft to the gearbox output shaft such that the gearbox output shaft is driven to rotate about its output shaft axis responsive to rotation of the gearbox input shaft about its input shaft axis; thus, when the gearbox input shaft is connected to the motor shaft, operation of the motor causes rotation of the gearbox output shaft. One such operable connection can be provided by a worm drive, particularly a worm drive having a worm on the gearbox input shaft that engages a worm gear on the gearbox output shaft.

A gearbox mounting structure is provided to allow the gearbox to be mounted to the lathe body such that the output shaft axis is substantially parallel to the spindle axis. In one embodiment, the mounting structure is configured to allow the position of the gearbox to be adjusted along the lathe body in a direction that is substantially normal to the output shaft axis to allow tensioning a drive system that connects the gearbox output shaft to the spindle shaft, as discussed below.

To transfer power from the gearbox output shaft to the spindle shaft, a power take-off element is attached to the gearbox output shaft and a spindle power input element is attached to the spindle shaft, these power elements being operably connected together by a flexible drive linkage. The flexible drive linkage connects the power take-off element to the spindle power input element so as to cause the spindle shaft to be driven by rotation of the gearbox output shaft, which in turn is rotated by the motor. In one embodiment, the power take-off element and the spindle power input element are pulleys, and the flexible drive linkage is a belt that connects the two pulleys together.

The flexible drive linkage can be tensioned by adjustably mounting the gearbox to the lathe body. Where the flexible drive linkage is a single belt that connects pulleys on the gearbox output shaft and the spindle shaft, the gearbox can be adjustably positioned on the lathe body such that changing the position of the gearbox on the lathe body changes the separation between the pulleys to adjust the tension of the belt passing thereover. Alternatively, an independent tensioning mechanism could be employed, such as passing the belt over a tension pulley which is adjustably mounted with respect to the lathe body.

A cover can be provided to enclose the flexible drive linkage, the power take-off element, and the spindle power input element. In one embodiment, a plate attached to the lathe body forms a base to which a cover can be attached to enclose these elements. Having the flexible drive linkage and associated elements enclosed reduces the risk of entanglement therewith when the lathe is in service.

Employing a separately sealed gearbox which does not incorporate the spindle shaft provides a benefit in that it simplifies sealing the gearbox; gearboxes typically employ radial lip seals for sealing their input and output shafts. These seals are subject to damage when exposed to flying debris such as cutting chips and/or exposed to vibration of the shaft passing therethrough. Due to both of these susceptibilities, not requiring the spindle shaft to be part of the gearbox provides particular benefit, since one of the seals for the spindle shaft is exposed to the metallic chips formed by cutting and both the spindle shaft seals are exposed to vibrations as a result of the cutting when the lathe is in service. Eliminating the spindle shaft seals from forming part of the gearbox provides a benefit in that the bearings which rotatably mount the spindle shaft in the lathe body need not provide an oil seal and thus do not require radial lip seals. These spindle bearings can be provided by greased bearings which are less susceptible to damage from infiltration of chips generated by the cutting operation. The input and output seals can now be isolated from much of the vibration resulting from cutting by use of the flexible linkage, and also these seals can be positioned at a greater distance from the location of the cutting operation, reducing the risk of damage from chips.

Placing the gearbox outside the lathe body also provides more effective heat dissipation for the gears. Another advantage is that, since the spindle bearings do not serve to maintain the position of the worm gear, they can be spaced further apart to provide greater stability for the spindle shaft. Additionally, it is technically simpler to provide an oil seal for the gearbox than an oil seal for the entire lathe body, since the gearbox is physically much smaller.

Since the lathe body does not need to form a sealed housing, it can be fabricated from plate stock. If formed from plate stock and bolted together, the structure can be readily reconfigured; however, a unitized structure provides greater rigidity. A cast lathe body can introduce other advantages in that it facilitates forming the body as a unitized structure which can be configured so as to have a variable cross-section to reduce transmission of vibrations. The use of a separate gearbox also allows one to readily alter the gear ratio to suit particular applications by simply changing the gearbox.

The present invention also increases the flexibility in changing the operating speed without changing the gear ratio, and thus does not require one to break and remake seals of a housing or replace the gearbox, to change the operating speed while employing a single-speed motor. A lathe incorporating the present invention can be modified by simply changing belts and pulleys which reside in a non-sealed environment. This simplifies reconfiguration of the lathe so as to change the operating speed of the spindle shaft.

If multiple power take-offs are provided to the gearbox output shaft and/or multiple power inputs to the spindle are provided, then a deraileur-type mechanism such as used on bicycles for chains and belts can be used to change the speed of the spindle by changing the sprockets or pulleys engaged by the chain or belt. Alternatively, multiple pulley pairs having differing reductions can be provided, each pair having a dedicated belt, and only one selected pair of pulleys being operably engaged with the gearbox output shaft and the spindle; this approach eliminates any structure to move the belt from one pulley to another. If pulleys are used, an alternative to allow varying the reduction in a continuous manner is to use an adjustable-diameter pulley such as taught in U.S. Pat. No. 3,939,720.

The lathe also has a cutting head and a feed mechanism that moves the cutting head along a feed path that is normal to the spindle axis. During the machining operation, the feed mechanism draws the cutting head across the disk surfaces to machine the brake disk. Typically, the speed of advance of the cutting head is matched to the spindle speed so as to maintain a constant feed speed in terms of distance moved per revolution, which is optimized for a particular geometry of the cutting bits of the lathe. To match the speed of the feed mechanism to the spindle speed, the feed mechanism can be powered by a feed power transmission that is driven by the same motor that powers the spindle shaft. In a conventional on-vehicle brake lathe, the feed mechanism is powered by a belt transmission driven by a feed power pulley that is mounted onto the spindle shaft, and thus is driven indirectly by the motor; this scheme can be used in the lathe of the present invention. Alternatively, the feed mechanism could be powered by a feed power pulley that is directly connected to the gearbox output shaft. Again, this will result in the advancement of the cutting head being matched to the spindle speed, since both are controlled by the speed of the motor.

It is sometimes desirable to allow the advance of the cutting head to be controlled independently of the spindle speed; this can be advantageous when moving the cutting head while not actively cutting, such as when moving the cutting head into a position at the inner edges of the surfaces to be machined before setting the depth of cut, since it allows the cutting head to be moved more quickly. In either case, it is preferred to have a disconnect mechanism to deactivate the motion of the cutting bits during the alignment process and while the depth of cut of the cutting bits is adjusted. To independently control the motion of the cutting head, the feed mechanism can be powered by a feed motor mounted to the lathe body. In this scheme, matching the speed of advancement to the rotation of the spindle shaft during the actual cutting operation can be done by electronically controlling the speed of the feed motor.

BRIEF DESCRIPTION OF THE FIGURES

FIG. 1 is a partially exploded view. In this embodiment, the lathe employs a separate feed motor to power a feed mechanism that draws a cutting head across the surfaces of a brake disk. The lathe has a spindle shaft which is powered by a belt drive linkage driven by a right-angle gearbox, which in turn is driven by a motor.

FIG. 2 is a partial view showing details of a structure for adjustably mounting the gearbox onto a lathe body so as to adjust the tension in the belt drive linkage.

FIG. 3 is an assembled view of the lathe shown in FIGS. 1 and 2, with only a cover removed. FIG. 3 illustrates an angle formed between a common centerline that connects the centers of two pulleys of the belt-drive linkage and a reference line that is normal to both an input shaft axis and an output shaft axis of the gearbox. The drive belt is tensioned by moving the gearbox along the lathe body so as to increase this angle.

DETAILED DESCRIPTION OF PREFERRED EMBODIMENTS

Figure 1:
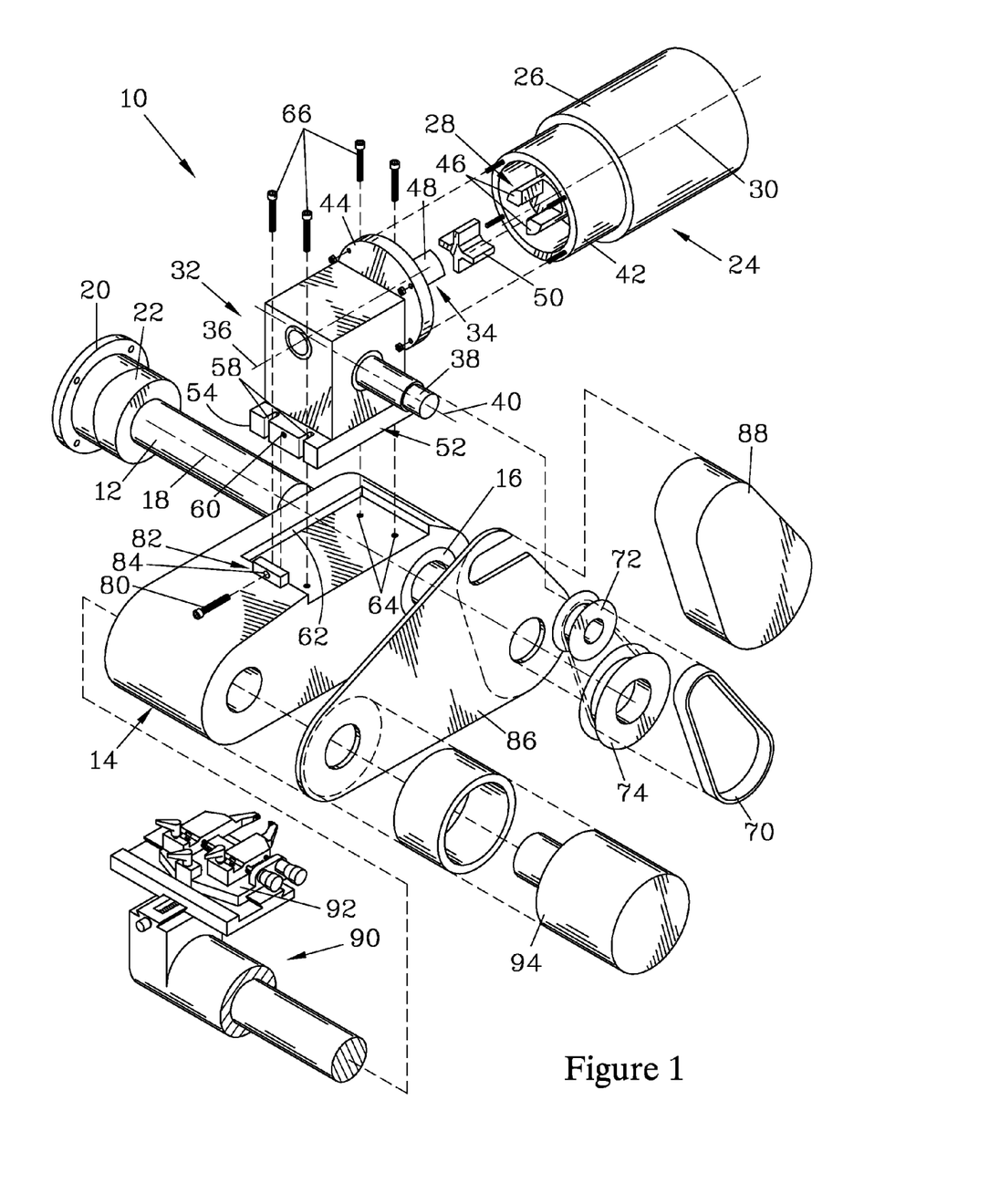
FIGS. 1-3 are isometric views that illustrate an on-vehicle disk brake lathe that forms one embodiment of the present invention.
Figure 2:
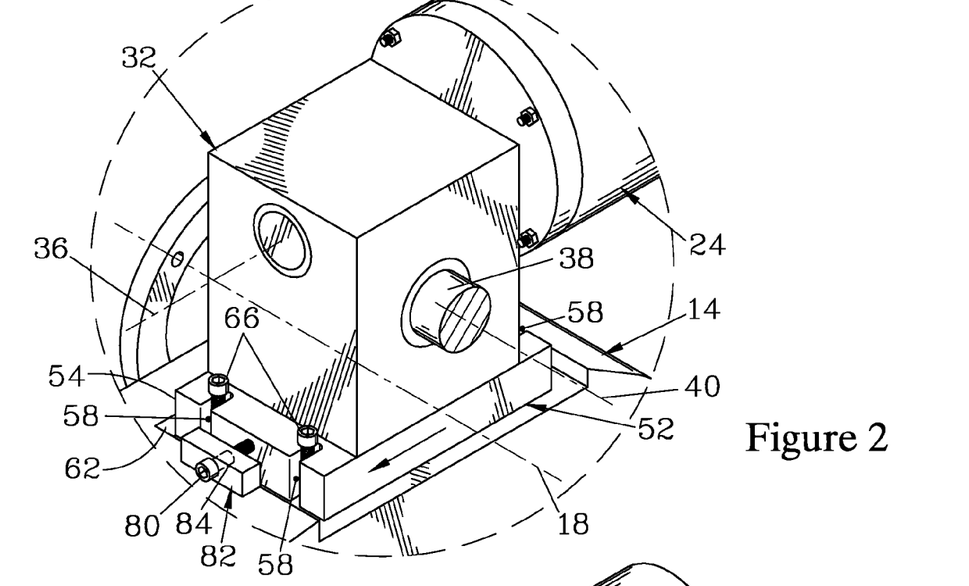
Figure 3:
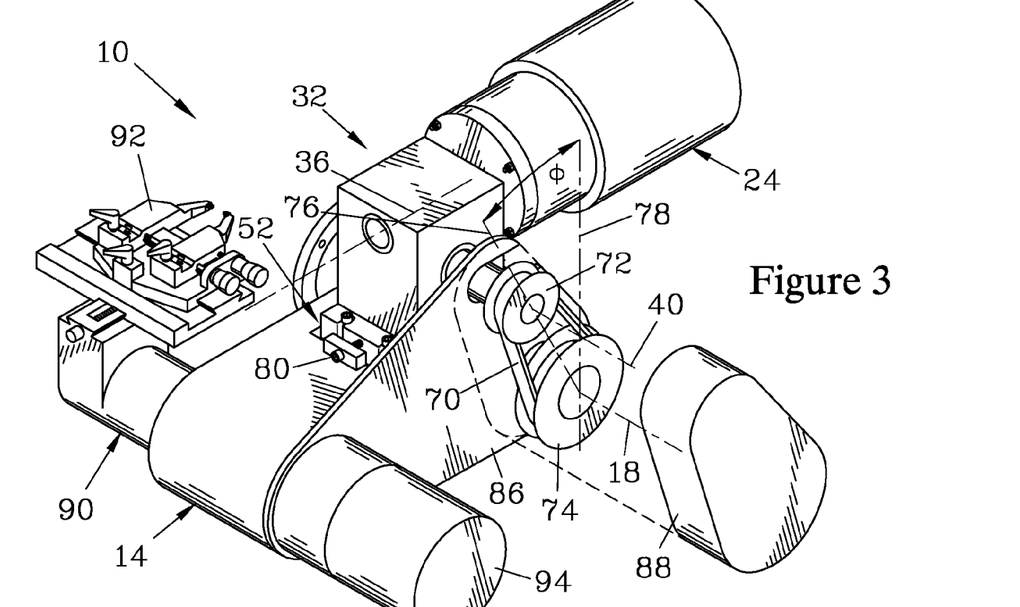

FIGS. 1-3 illustrate an on-vehicle disk brake lathe 10 that forms one embodiment of the present invention; FIG. 1 shows the lathe 10 exploded, while FIG. 3 shows the lathe 10 mostly assembled. The lathe 10 has a spindle shaft 12 (shown in FIG. 1) that is rotatably mounted in a lathe body 14 by spindle bearings 16 (only one of which is visible), so as to rotate about a spindle axis 18. Because the lathe body 14 does not house internal gearing, the spindle bearings 16 can be grease-packed bearings which should resist any infiltration by chips generated during cutting. These spindle bearings 16 can be readily spaced apart at a separation sufficient to provide a high degree of stability for the spindle shaft 12. A hub mount 20 designed to be attached to a wheel hub of a vehicle is connected to the spindle shaft 12 by an alignment mechanism 22 that can be adjusted to align the spindle axis 18 with respect to a wheel hub axis of a wheel hub to which the hub mount 20 is attached in service. Examples of such alignment mechanisms are taught in U.S. Pat. No. 6,101,911.

A motor 24 is provided for driving the spindle shaft 12. The motor 24 has a motor body 26 and a motor shaft 28 that rotates about a motor axis 30. To allow the rotation speed of the spindle shaft 12 to be varied, the motor 24 can be a variable speed motor. Alternatively, when a single-speed motor is employed, variable speed can be provided by altering the structure of the lathe of the present invention, as discussed below with regard to FIGS. 6 and 7.

A right-angle gearbox 32 is provided, having a gearbox input shaft 34 that rotates about an input shaft axis 36 and a gearbox output shaft 38 that rotates about an output shaft axis 40 which is normal to the input shaft axis 36. In service, the gearbox input shaft 34 is aligned with and coupled to the motor shaft 28. In the lathe 10 illustrated, a mounting collar 42 is affixed to the motor body 26 and in turn is attached to a mounting flange 44 provided on the gearbox 32 to affix the motor body 26 with respect to the gearbox 32. The motor shaft 28 is provided with a pair of motor shaft lugs 46 that are configured to mate with a pair of input shaft lugs 48 provided on the gearbox input shaft 34 (only one of the input shaft lugs 48 is visible in FIG. 1). A spider member 50 is interposed between the opposed surfaces of the lugs (46, 48). The spider member 50 is formed from a resilient material, such as a synthetic rubber, and provides resiliency in the coupling of the motor shaft 28 to the gearbox input shaft 34 to damp vibrations resulting from fluctuations or variations in the speed of rotation of the motor shaft 28.

To mount the gearbox 32 to the lathe body 14, a mounting block 52 is affixed to the gearbox 32. In this embodiment, the mounting block 52 is designed to adjustably mount the gearbox 32 to the lathe body 14. The mounting block 52 has a guide edge 54 that extends parallel to the input shaft axis 36 and has two pairs of fastener slots 58 (only one pair of which is visible in FIG. 1) that also extend parallel to the input shaft axis 36. The mounting block 52 is sized such that the fastener slots 58 extend beyond the footprint of the gearbox 32 to which the mounting block 52 is attached. The mounting block 52 also has a tension screw receptor 60. The lathe body 14 is provided with a ledge 62 that extends normal to the spindle axis 18 and is positioned such that the guide edge 54 of the mounting block 52 can slide therealong. The lathe body 14 is also provided with an arrangement of threaded holes 64 (shown in FIG. 1) that are positioned to receive fasteners 66 passing through the fastener slots 58 when the guide edge 54 is slidably engaged with the ledge 62. To allow alternate gearboxes to be mounted, alternative mounting blocks could be employed to match the attachment structure of a particular gearbox.

FIG. 2 is a detail view showing the mounting block 52 positioned on the lathe body 14 with the guide edge 54 slidably engaged with the ledge 62 and the fasteners 66 threadably engaged with the threaded holes 64 (shown in FIG. 1) and passing through the fastener slots 58, but not yet tightened. The gearbox 32 and the mounting block 52 are positioned on the lathe body 14 such that the output shaft axis 40 is parallel to the spindle axis 18, and can be moved in a direction normal to these axes (40, 18) and parallel to the input shaft axis 36 to a desired position before tightening the fasteners 66 in the threaded holes 64 to affix the gearbox 32 and the mounting block 52 to the lathe body 14. This adjustment of position allows adjusting the tension in a drive belt 70 as discussed below.

The drive belt 70 serves as a flexible drive linkage that connects between a power take-off element 72, which is mounted on the gearbox output shaft 38, and a spindle power input element 74, which is mounted on the spindle shaft 12. The drive belt 70 serves to transfer rotary motion from the gearbox output shaft 38 to the spindle shaft 12 to allow the spindle shaft 12 to be driven by the gearbox output shaft 38. In the illustrated embodiment, where the flexible drive linkage is provided by the drive belt 70, the power take-off element 72 is a drive pulley and the spindle power input element 74 is a spindle pulley. While the drive belt 70 is illustrated as a smooth flat belt, it should be appreciated that a V-belt or a timing belt could be employed. Similarly, the flexible drive linkage could be provided by a chain, in which case the power take-off element and the spindle power input element would be provided by sprockets.

To prevent damage to the gearbox 32 and the motor 24, at least one of the power elements (72, 74) can be designed to slip on its associated shaft (38, 12) if the torque is excessive; thus, if rotation of the spindle shaft 12 is interrupted, the slippage of the power element (72, 74) on its associated shaft (38, 12) allows the continued rotation of the gearbox shafts (34, 38) and the motor shaft 28. It should be noted that, while the ledge 62 on the lathe body 14 must extend normal to the spindle axis 18, its position on the lathe body 14 is not critical, since the position of the power elements (72, 74) on their respective shafts (38, 12) can be adjusted.

The power take-off element 72 can be made smaller than the spindle power input element 74 to obtain a further reduction from that typically provided by the gearbox 32. Since losses due to friction in a worm drive increase as the gear ratio is increased, sizing the power take-off element 72 and the spindle power input element 74 to provide a further reduction in the connection from the gearbox output shaft 38 to the spindle shaft 12 allows the use of a lower gear ratio in the gearbox 32 between the gearbox input shaft 34 and the gearbox output shaft 38. This reduction in the gear ratio reduces frictional losses in the gearbox 32 and provides greater efficiency for the lathe 10.

FIGS. 2 and 3 show the structure associated with tensioning of the drive belt 70. The threaded holes 64 are positioned on the lathe body 14 such that, when the gearbox 32 and the mounting block 52 are positioned on the lathe body 14 such that the fasteners 66 can pass through the fastener slots 58 into the threaded holes 64, the gearbox 32 is positioned such that a common centerline 76 that connects the center of the power elements (72, 74) is at a slight angle $\Phi$ to a reference line 78 that is normal to both the input shaft axis 36 and the output shaft axis 40, as shown in FIG. 3. A tension screw 80 forcibly engages a tension screw bracket 82 and passes through a tension screw passage 84 in the tension screw bracket 82 to threadably engage the tension screw receptor 60 on the mounting block 52. As the tension screw 80 is tightened, the mounting block 52 is moved closer to the tension screw bracket 82, thereby moving the gearbox 32 along the lathe body 14 so as to increase the angle $\Phi$ between the common centerline 76 and the reference line 78. The increased angle $\Phi$ increases the separation of the power elements (72, 74) and serves to tension the drive belt 70. Once the desired tension in the drive belt 70 has been achieved, the fasteners 66 are tightened to affix the gearbox 32 to the lathe body 14. The fasteners 66 can be loosened and the tension screw 80 turned to allow slack in the drive belt 70 to facilitate removal of the drive belt 70 when elements of the lathe 10 are to be repaired or replaced. It might be noted that keeping the angle Φ relatively small causes the tension force of the drive belt 70 to predominantly pull the gearbox 32 and lathe body 14 together to increase the rigidity in the mounting of the gearbox 32 to the lathe body 14. This configuration also reduces the length needed for the drive belt 70, reducing problems of stretching.

A cover plate 86 and a cover 88 are provided to enclose the drive belt 70 and the power elements (72, 74) to prevent a risk of nearby objects becoming entangled with these elements. The cover plate 86 mounts against the lathe body 14, with the spindle shaft 12 and the gearbox output shaft 38 passing therethrough, and the cover 88 attaches to the cover plate 86.

The lathe 10 has a feed mechanism 90 that advances a cutting head 92 in a direction normal to the spindle axis 18 to allow the cutting head 92 to machine a brake disk to which the hub mount 20 is connected. Such feed mechanisms are well known to one skilled in the art, and are typically powered by a take-off from the spindle shaft, which serves to match the advancement of the cutting head with the rotational speed of the spindle shaft. However, in the lathe 10 illustrated, the feed mechanism 90 is powered by a dedicated feed motor 94, which can be matched to the rotation of the spindle shaft 12 during cutting operations by an electronic controller (not shown), but which can provide independent movement of the cutting head 92 when not cutting, to speed positioning of the cutting head 92 and reduce the overall time of machining operations.

Figure 4:
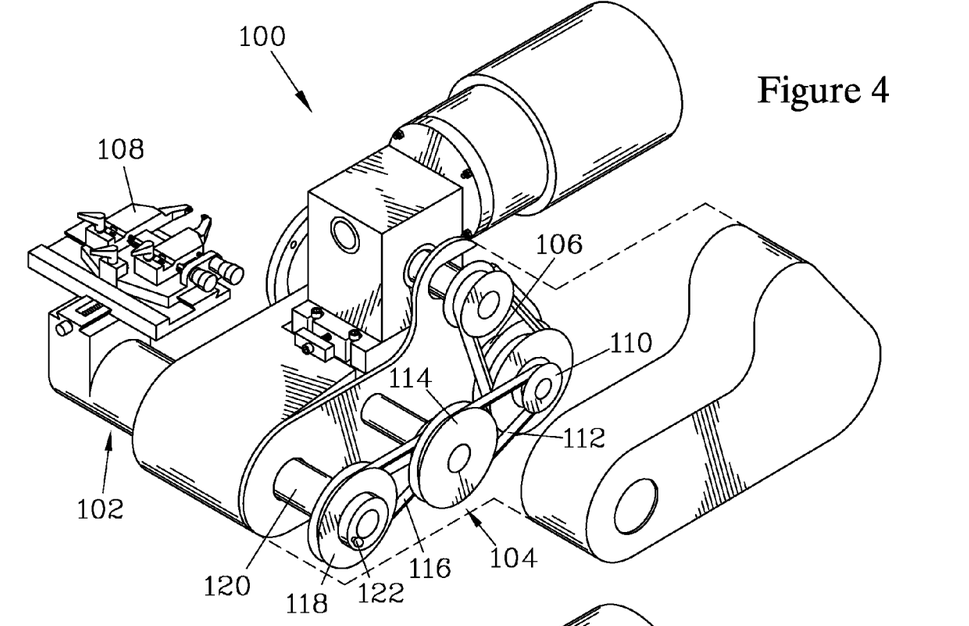
FIG. 4 is an isometric view of another on-vehicle disk brake lathe. In this embodiment, the feed mechanism is powered by a belt transmission driven by a takeoff pulley mounted on the spindle shaft.

FIG. 4 illustrates an on-vehicle disk brake lathe 100 that has many features in common with the lathe 10 shown in FIGS. 1-3, but which employs a different scheme for powering a feed mechanism 102. In the lathe 100, the feed mechanism 102 is powered by a take-off system 104 which transfers power from a spindle shaft 106 in a manner similar to that employed in conventional on-vehicle disk brake lathes. Since the take-off system 104 powers the feed mechanism 102 from the spindle shaft 106, the speed of advance of a cutting head 108 is automatically matched to the rotation speed of the spindle shaft 106.

A feed power take-off pulley 110 is mounted on the spindle shaft 106, and is engaged by a feed drive first belt 112. The feed drive first belt 112 in turn drives a feed drive idler pulley 114 which is a double pulley that is also engaged by a feed drive second belt 116. The feed drive second belt 116 powers a feed power input pulley 118 which is mounted to a feed power input shaft 120 that powers the feed mechanism 102. The feed pulleys (110, 114, 118) and the feed drive belts (112, 116) provide a two-stage speed reduction between the spindle shaft 106 and the feed power input shaft 120. To allow the position of the cutting head 108 to be moved independently, the feed power input pulley 118 is connected to the feed power input shaft 120 by a manually-operable clutch 122 which can be selectively positioned by a lathe operator to either allow or not allow rotation between the feed power input pulley 118 and the feed power input shaft 120; such manually-operable clutches are employed in conventional on-vehicle disk brake lathes.

Figure 5:
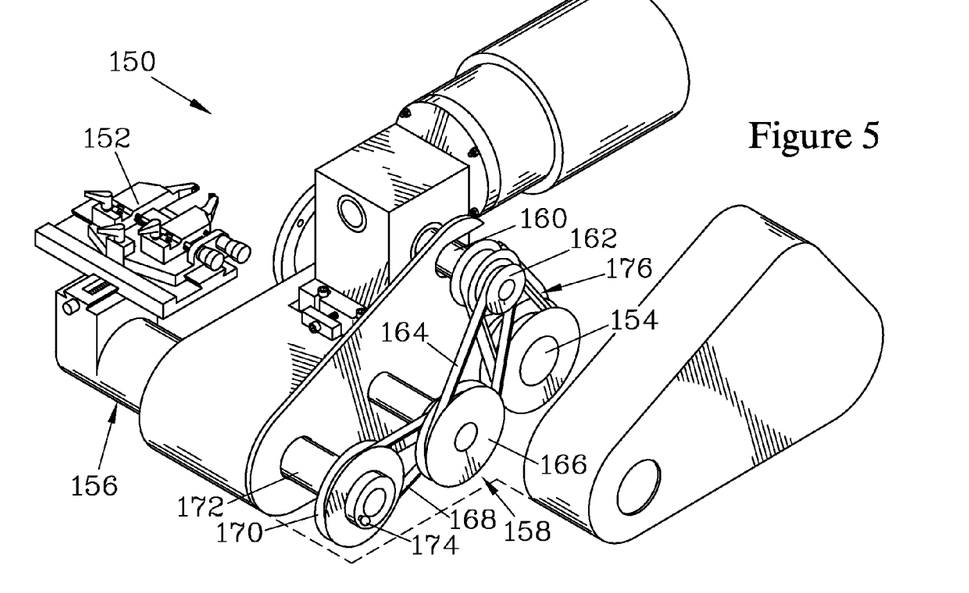
FIG. 5 is an isometric view of an on-vehicle disk brake lathe that is similar to that shown in FIG. 4, but where the feed mechanism is powered by a takeoff pulley mounted on a gearbox output shaft.

FIG. 5 is an isometric view of a lathe 150 that forms another embodiment of the present invention, which again matches the motion of a cutting head 152 to the rotational speed of a spindle shaft 154. In the lathe 150, a feed mechanism 156 which advances the cutting head 152 is powered by a take-off system 158 that engages a gearbox output shaft 160, rather than the spindle shaft 154.

A feed power take-off pulley 162 is mounted on the gearbox output shaft 160, and is engaged by a feed drive first belt 164. The feed drive first belt 164 transfers power to a feed drive idler pulley 166, which is a double pulley that is also engaged by a feed drive second belt 168. The feed drive second belt 168 transfers power to a feed power input pulley 170, which is mounted to a feed power input shaft 172 by a manually-operable clutch 174.

The gearbox output shaft 160 also drives the spindle shaft 154 via a flexible drive system 176 that can be similar to the structure for driving the spindle shaft 12 shown in FIGS. 1-3. Since the gearbox output shaft 160 drives both the spindle shaft 154 and the feed mechanism 156, the speed of advance of the cutting head 152 provided by the feed mechanism 156 is matched to the rotation speed of the spindle shaft 154.

The embodiments discussed above have a set speed reduction for the spindle shaft relative to the motor. If the rotation speed of the spindle shaft is to be varied, such is accomplished by varying the motor speed. One situation where it may be desirable to change the spindle shaft speed is to reduce the spindle speed when the lathe is employed to machine a brake disk on a vehicle equipped with locking differentials.

Figure 6:
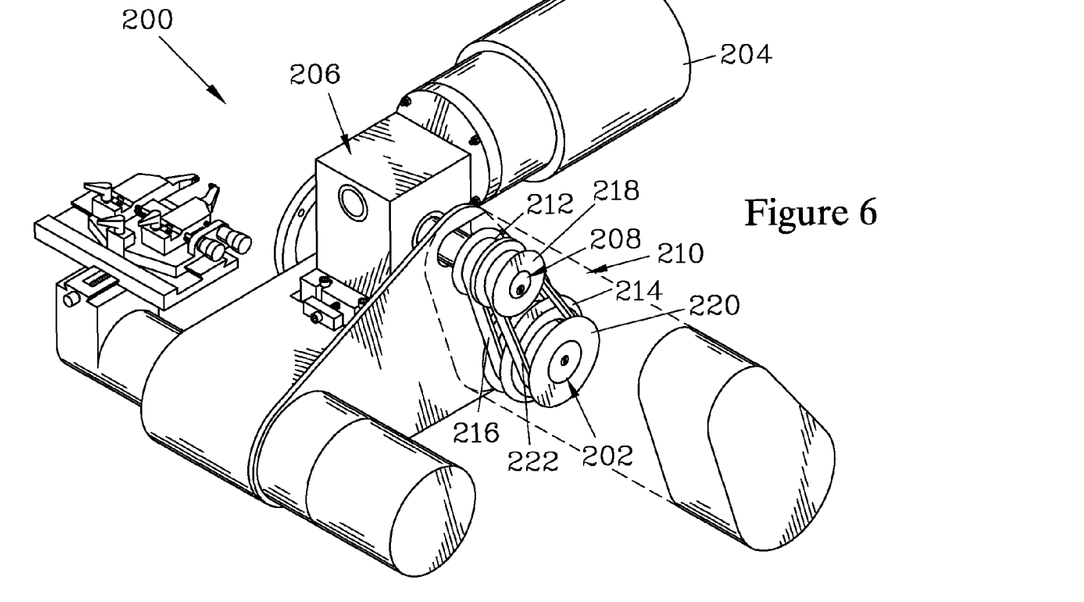
FIG. 6 is an isometric view of a lathe similar to that shown in FIG. 1, but where the belt drive linkage has a pair of belts, each engaging a pair of pulleys. Either pair of pulleys can be selectively engaged with the gearbox and the spindle shaft to provide a desired reduction ratio to vary the speed of the spindle shaft when a single-speed motor is employed.

FIG. 6 illustrates a lathe 200 which has a variable-speed drive system to provide two different rotational speeds for a spindle shaft 202 that is powered by a single-speed motor 204. The lathe 200 again employs a gearbox 206 that is driven by the motor 204 and provides power through a gearbox output shaft 208. The lathe 200 has a flexible drive system 210 that transfers power from the gearbox output shaft 208 to the spindle shaft 202, and which provides two speeds for the spindle shaft 202.

Figure 7:
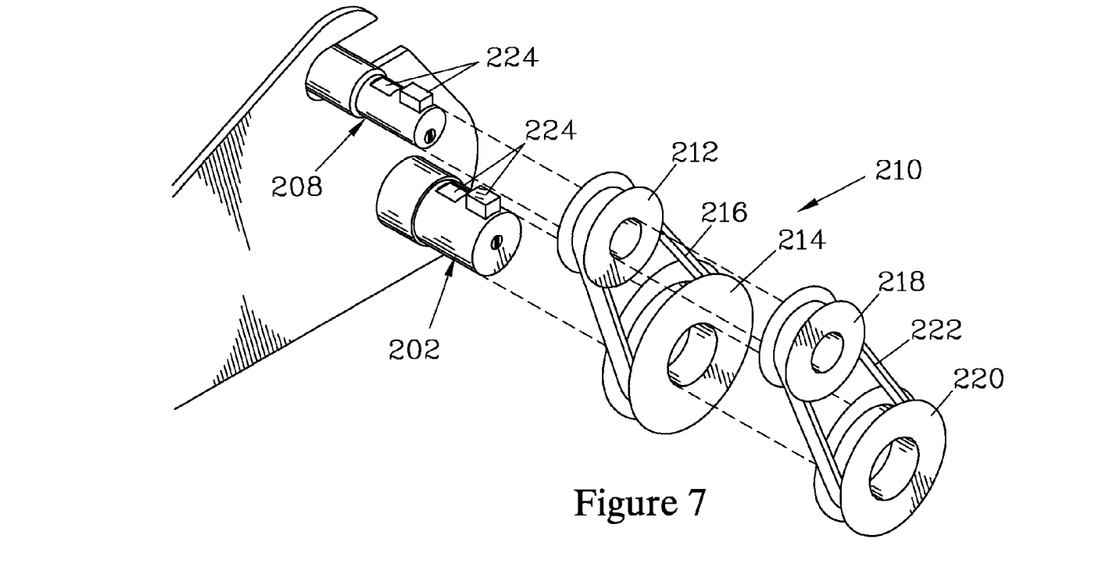
FIG. 7 is a detail view of the pulleys employed in the embodiment shown in FIG. 6, showing retractable keys on a gearbox output shaft and on a spindle shaft that allow selected pairs of pulleys to be affixed with respect to the shafts so as to rotate therewith.

The flexible drive system 210 has a first drive pulley 212 and a first spindle pulley 214, which are connected together by a first drive belt 216 as better shown in the exploded view of FIG. 7. The flexible drive system 210 also has a second drive pulley 218 and a second spindle pulley 220, which are connected together by a second drive belt 222. In the lathe 200, the first drive pulley 212 and the second drive pulley 218 are the same size, but the second spindle pulley 220 is smaller than the first spindle pulley 214, and thus driving the spindle shaft 202 via the second spindle pulley 220 causes the spindle shaft 202 to rotate at a faster speed than when driven by the first spindle pulley 214.

To select which pair of pulleys (212 and 214, 218 and 220) is active, the spindle shaft 202 and the gearbox output shaft 208 can be provided with retractable keys 224, as shown in the partially exploded view of FIG. 7. The keys 224 for the selected pair of pulleys (212 and 214 or 218 and 220) are extended and engage recesses (not shown) in the pulleys (212 and 214 or 218 and 220) to prevent rotation of the pulleys (212 and 214 or 218 and 220) on their respective shafts (208 and 202). The keys 224 for the other pair of pulleys (212 and 214 or 218 and 220) are retracted so as to not protrude from the surfaces of the shafts (208, 202), allowing free rotation of the inactive pulleys (212 and 214 or 218 and 220) on their respective shafts (208 and 202).

Figure 8:
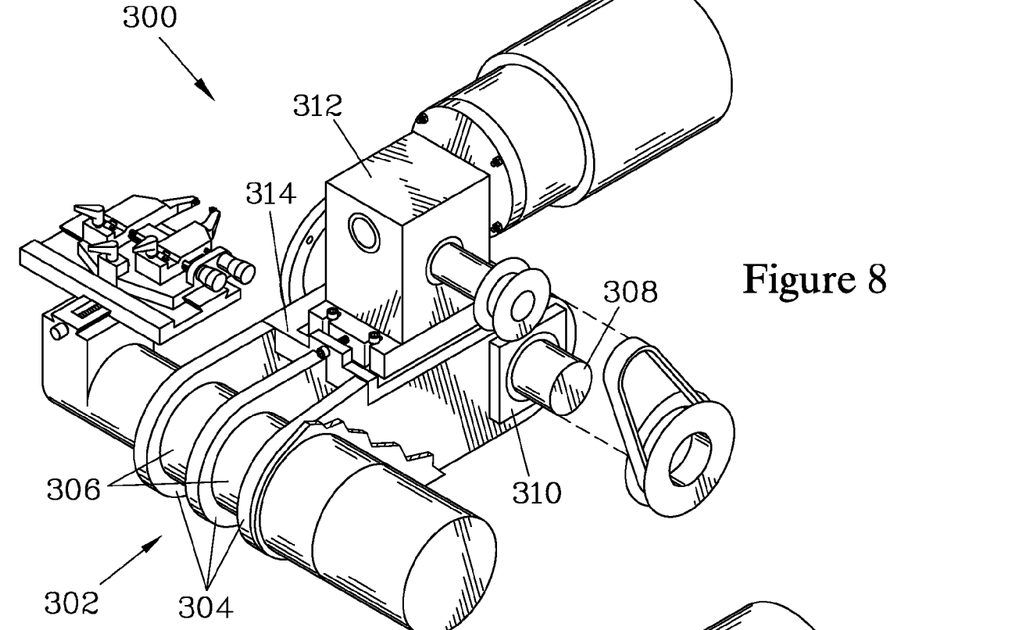
FIG. 8 is an isometric view of a lathe that is functionally similar to that shown in FIG. 1, but where the lathe body is a modular structure formed using plates and spacers; the modular nature of the lathe body allows it to be readily fabricated.

FIG. 8 illustrates a lathe 300 which is functionally similar to the lathe 10 shown in FIGS. 1-3, but which has a different structure for providing a lathe body 302. In this embodiment, the lathe body 302 is a modular structure formed by a series of body plates 304 separated by body spacers 306. A spindle shaft 308 is mounted in spindle bearings 310 (only one of which is visible) that attach to the body plates 304, while a gearbox 312 is adjustably mounted to a top plate 314 that is affixed to the body plates 304.

Figure 9:
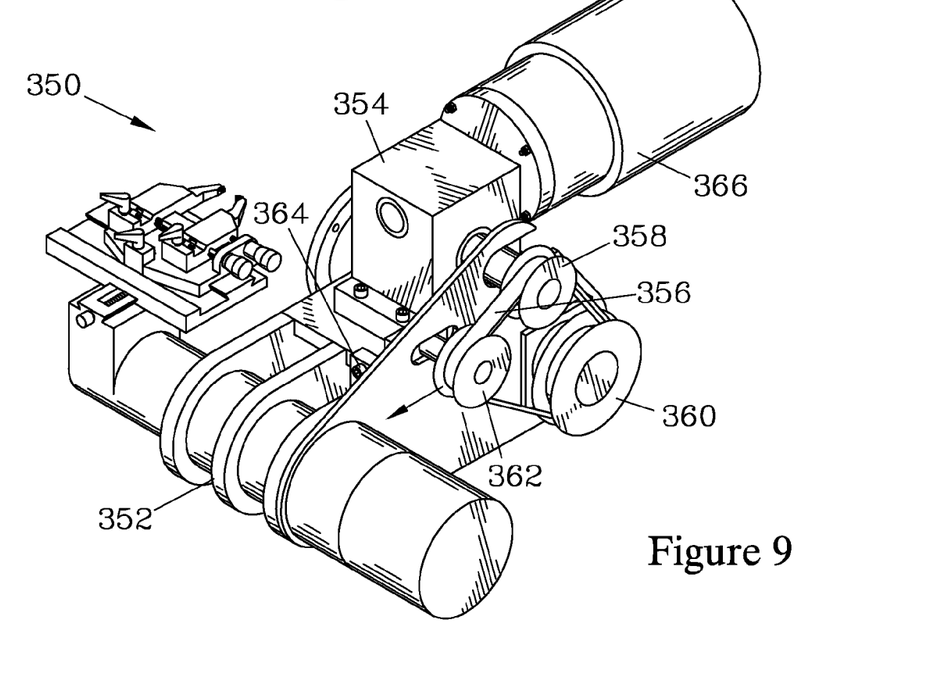
FIG. 9 is an isometric view of another lathe having a modular lathe body formed using plates and spacers, but differing in the structure for tensioning the drive belt. In this embodiment, the gearbox is affixed to a particular position on the lathe body and the position of a tension pulley is adjusted to place tension on the drive belt.

FIG. 9 illustrates a lathe 350 which again has a lathe body 352 formed as a modular structure. In the lathe 350, a gearbox 354 is affixed in a prescribed position on the lathe body 352, and thus cannot be positioned to adjust the tension of a drive belt 356 by adjusting the separation between a drive pulley 358 and a spindle pulley 360. Instead, in the lathe 350 the drive belt 356 also passes over a tensioning pulley 362 that is adjustably mounted with respect to the lathe body 352. Adjusting the position of the tensioning pulley 362 by a tension screw 364 adjusts the tension of the drive belt 356. Such a tensioning scheme could also be employed in a lathe having a cast body, such as shown in FIGS. 1-7.

Since the gearbox 354 is affixed to the lathe body 352 at a prescribed position in this embodiment, a motor 366 employed in the lathe 350 could be fixed directly to the lathe body 352, rather than being mounted to the gearbox 354, without requiring a coupling structure that can accommodate the adjustment of the position of the gearbox 354 with respect to the motor 366 along the lathe body 352.

While the novel features of the present invention have been described in terms of particular embodiments and preferred applications, it should be appreciated by one skilled in the art that substitution of materials and modification of details can be made without departing from the spirit of the invention.

What we claim is:

1. A hub-mounted on-vehicle disk brake lathe that attaches to a wheel hub of a vehicle in order to machine a brake disk mounted on the wheel hub while the brake disk remains attached to the wheel hub and rotates about a wheel hub axis, the brake lathe comprising:
    a spindle shaft rotating about a spindle axis;
    a hub mount which attaches to the wheel hub of the vehicle on which the brake disk is mounted, said hub mount having a plurality of passages to accept wheel fasteners passing therethrough to secure said hub mount to the wheel hub, thereby supporting the lathe on the wheel hub;
    an alignment mechanism operably connected between said spindle shaft and said hub mount so as to position the lathe relative to the wheel hub and being operable to align said spindle axis with respect the wheel hub axis to reduce misalignment of said spindle axis relative to the wheel hub axis and thereby reduce motion of the lathe relative to the wheel hub which would otherwise introduce lateral runout into the machined brake disk;
    a lathe body having a pair of spindle bearings in which said spindle shaft is rotatably mounted;
    a motor for driving said spindle shaft, said motor having a motor shaft that rotates about a motor axis;
    a right-angle gearbox having,
        a gearbox input shaft that rotates about an input shaft axis, said gearbox input shaft aligning with said motor shaft thereby assuring that said shafts are substantially coaxial and said gearbox input shaft operably connecting to said motor shaft,
        a gearbox output shaft rotating about an output shaft axis that is normal to said input shaft axis, and
        a gearbox mounting structure for mounting said right-angle gearbox to said lathe body such that said gearbox output shaft is parallel to said spindle axis;
    a motor mount for mounting said motor with respect to said right-angle gearbox such that said motor axis is aligned with said input shaft axis;
    a power take-off element attached to said gearbox output shaft;
    a spindle power input element attached to said spindle shaft;
    a flexible drive linkage that operably connects said power take-off element to said spindle power input element so as to cause said spindle shaft to be driven by rotation of said gearbox output shaft;
    a cutting head movably engaged to said lathe body so as to allow tool bits mounted on said cutting head to cuttably engage the brake disk; and
    a feed mechanism for directing the tool bits across the disk along a feed path as the disk rotates.

2. The on-vehicle disk brake lathe of claim 1 further comprising:
    means for tensioning said flexible drive linkage operably connecting said power take-off element and said spindle power input element.

3. The on-vehicle disk lathe of claim 2 wherein said feed mechanism for directing the tool bits across the disk as the disk rotates is powered by said gearbox output shaft.

4. The on-vehicle disk brake lathe of claim 3 further comprising:
    a feed power element driven by said gearbox output shaft;
    a feed input element connected to said feed mechanism by a feed clutch mechanism which can be engaged to cause said cutting head to move along said feed path when said feed input element is rotated;
    a flexible feed power linkage that operably connects said feed power element to said feed input element.

5. The on-vehicle disk brake lathe of claim 4 wherein said feed power element is provided by a feed power pulley mounted on said spindle shaft.

6. The on-vehicle disk brake lathe of claim 4 wherein said feed power element is provided by a feed power pulley mounted on said gearbox output shaft.

7. The on-vehicle disk brake lathe of claim 2 wherein said power take-off element and said spindle power input element are pulleys and wherein said flexible drive linkage is a drive belt that engages said pulleys.

8. The on-vehicle disk brake lathe of claim 7 wherein said means for tensioning said flexible drive linkage is provided by a tension pulley that is mounted with respect to said lathe body so as to be adjustably positionable with respect to said power take-off element and said spindle power input element.

9. The on-vehicle disk brake lathe of claim 7 wherein said lathe body is a modular body that further comprises:
    a first lathe body plate, to which one of said spindle bearings is affixed;
    a second lathe body plate, to which the other of said spindle bearings is affixed;
    at least one spacer element mounted between said first lathe body plate and said second lathe body plate,
        said second lathe body plate being affixed with respect to said first lathe body plate with said at least one spacer element interposed therebetween.

10. The on-vehicle disk brake lathe of claim 7 wherein said lathe body is a unitized structure.

11. The on-vehicle disk brake lathe of claim 7 wherein said motor mount affixes said motor to said right-angle gearbox.

12. The on-vehicle disk brake lathe of claim 11 wherein said means for tensioning said flexible drive linkage is provided by said gearbox mounting structure, which is configured to allow the position of said right-angle gearbox on said lathe body to be adjusted along a line substantially normal to said spindle axis and said output shaft axis.

13. The on-vehicle disk brake lathe of claim 1 further comprising:
    a feed motor mounted with respect to said lathe body and operably connected to said feed mechanism.

14. The on-vehicle disk brake lathe of claim 1 wherein:
said power take-off element has a first drive element and a second drive element mounted on said gearbox output shaft;
said spindle power input element has a first spindle element and a second spindle element mounted on said spindle shaft; and
further wherein the brake lathe further comprises:
means for selectively activating either said first drive element and said first spindle element or said second drive element and said second spindle element such that the selectively activated drive element rotates with said gearbox output shaft and drives said flexible drive linkage, and the selectively activated spindle element is driven by said flexible drive linkage and causes rotation of said spindle shaft,
said first drive element and said first spindle element providing a different reduction ration that said second drive element and said second spindle element.

15. The on-vehicle disk brake lathe of claim 14 wherein said drive elements and said spindle elements are pulleys and said flexible drive linkage is provided by at least one drive belt that engages at least one pair of said pulleys.

16. The on-vehicle disk brake lathe of claim 15 wherein said flexible drive linkage has a first drive belt that engages said first drive element and said first spindle element and a second drive belt that engages said second drive element and said second spindle element,
further wherein said means for selectively activating either said first drive element and said first spindle element or said second drive element and said second spindle element operates by selectively locking and unlocking said pulleys with respect to said shafts to which they are mounted such that said pulleys can rotate on said shafts when unlocked.

17. The on-vehicle disk brake lathe of claim 1 further comprising:
motor shaft lugs provided on said motor shaft;
input shaft lugs provided on said gearbox input shaft and configured to be axially insertable between said motor shaft lugs; and
a resilient spider member configured so as to be interposed between and in engagement with said motor shaft lugs and said input shaft lugs so as to allow said motor shaft lugs to apply torque to said input shaft lugs, thereby operably connecting said gearbox input shaft to said motor shaft.

18. A hub-mounted on-vehicle disk brake lathe that attaches to a wheel hub of a vehicle in order to machine a brake disk mounted on the wheel hub while the brake disk remains attached to the wheel hub and rotates about a wheel hub axis, the brake lathe comprising:
a spindle shaft rotating about a spindle axis;
a hub mount which attaches to the wheel hub of the vehicle on which the brake disk is mounted, said hub mount having a plurality of passages to accept wheel fasteners passing therethrough to secure said hub mount to the wheel hub, thereby supporting the lathe on the wheel hub;
an alignment mechanism operably connected between said spindle shaft and said hub mount so as to position the lathe relative to the wheel hub and being operable to align said spindle axis with respect the wheel hub axis to reduce misalignment of said spindle axis relative to the wheel hub axis and thereby reduce motion of the lathe relative to the wheel hub which would otherwise introduce lateral runout into the machined brake disk;
a lathe body having a pair of spindle bearings in which said spindle shaft is rotatably mounted;
a motor for driving said spindle shaft, said motor having a motor shaft that rotates about a motor axis;
a right-angle gearbox having,
a gearbox input shaft that rotates about an input shaft axis, said gearbox input shaft aligning with said motor shaft, thereby assuring that said gearbox input shaft is substantially coaxial therewith, and said gearbox input shaft operably connecting to said motor shaft,
a gearbox output shaft rotating about an output shaft axis that is normal to said input shaft axis, and
a gearbox mounting structure for mounting said right-angle gearbox to said lathe body such that said gearbox output shaft is parallel to said spindle axis;
a motor mount for mounting said motor with respect to said right-angle gearbox such that said motor axis is aligned with said input shaft axis;
a variable-speed drive system that operably connects said gearbox output shaft to said spindle shaft via a flexible drive linkage so as to cause said spindle shaft to be driven by rotation of said gearbox output shaft and having means for varying the reduction ratio of rotation of said spindle shaft with respect to rotation of said gearbox output shaft;
a cutting head movably engaged to said lathe body so as to allow tool bits mounted on said cutting head to cuttably engage the brake disk; and
a feed mechanism for directing the tool bits across the disk along a feed path as the disk rotates.

19. The on-vehicle disk brake lathe of claim 18 wherein said variable-speed drive system further comprises:
a power take-off element attached to said gearbox output shaft;
a spindle power input element attached to said spindle shaft,
said flexible drive linkage operably connecting said power take-off element to said spindle power input element.

20. The on-vehicle disk brake lathe of claim 19 wherein said power take-off element is at least one drive pulley, said spindle power input element is at least one spindle pulley, and said flexible drive linkage is at least one drive belt that engages a pair of said pulleys.

21. The on-vehicle disk brake lathe of claim 20 wherein said power take-off element has a first drive pulley and a second drive pulley and said spindle power input element has a first spindle pulley and a second spindle pulley providing a different reduction ratio than said first drive element and said first spindle element.

22. The on-vehicle disk brake lathe of claim 19 wherein said means for varying the reduction ratio of rotation of said spindle shaft with respect to rotation of said gearbox output shaft operates by varying the effective relative diameters of said power take-off element attached and said spindle power input element with respect to their engagement with said flexible drive linkage.

* * * * *